(12) United States Patent
Crego et al.

(10) Patent No.: US 11,810,365 B1
(45) Date of Patent: Nov. 7, 2023

(54) PERCEPTION ERROR MODELING

(71) Applicant: Zoox, Inc., Foster City, CA (US)

(72) Inventors: Andrew Scott Crego, Foster City, CA (US); Gowtham Garimella, Burlingame, CA (US); Mahsa Ghafarianzadeh, Emerald Hills, CA (US); Rasmus Fonseca, Boulder Creek, CA (US); Muhammad Farooq Rama, Santa Clara, CA (US); Kai Zhenyu Wang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 385 days.

(21) Appl. No.: 17/122,998

(22) Filed: Dec. 15, 2020

(51) Int. Cl.
*G06V 20/58* (2022.01)
*B60W 60/00* (2020.01)
*G06F 18/213* (2023.01)
*G06F 18/214* (2023.01)
*G06F 18/2415* (2023.01)

(52) U.S. Cl.
CPC ........... *G06V 20/58* (2022.01); *B60W 60/001* (2020.02); *G06F 18/213* (2023.01); *G06F 18/214* (2023.01); *G06F 18/2415* (2023.01); *B60W 2554/4049* (2020.02)

(58) Field of Classification Search
CPC ............... G06V 20/58; B60W 60/001; B60W 2554/4049; G06F 18/214; G06F 18/2415; G06F 18/213
USPC ......................................................... 382/104
See application file for complete search history.

(56) References Cited

U.S. PATENT DOCUMENTS

| | | | |
|---|---|---|---|
| 2007/0192013 A1* | 8/2007 | Bando | B60T 7/22 701/532 |
| 2021/0117818 A1* | 4/2021 | Teng | G06N 5/04 |

* cited by examiner

*Primary Examiner* — Michael R Neff
(74) *Attorney, Agent, or Firm* — Lee & Hayes, P.C.

(57) ABSTRACT

Techniques for modeling the probability distribution of errors in perception systems are discussed herein. For example, techniques may include modeling error distribution for attributes such as position, size, pose, and velocity of objects detected in an environment, and training a mixture model to output specific error probability distributions based on input features such as object classification, distance to the object, and occlusion. The output of the trained model may be used to control the operation of a vehicle in an environment, generate simulations, perform collision probability analyses, and to mine log data to detect collision risks.

20 Claims, 9 Drawing Sheets

PERCEPTION ERROR MODELING

BACKGROUND

Autonomous vehicles may define and navigate along routes partially or entirely without the assistance of a human driver. To determine driving actions and select navigation routes, a vehicle may use a perception system to detect objects in an environment based on sensor data, and a prediction system to predict the behaviors or tracks of the detected objects. Perception and prediction systems may not be completely accurate, and as such the vehicle systems may assume a certain amount of error within the perception data and the predictions relating to the other objects in the environment. Identifying and addressing perception and prediction errors may be technically challenging, both for autonomous vehicles traversing in physical environments, and in driving simulation systems. For example, an autonomous vehicle may create a safety buffer around a detected object in the environment to account for potential errors within its perception and prediction systems. However, if the vehicle selects a safety buffer that is too small it may risk colliding with the object, if it selects too large of a safety buffer it may hinder the navigation of the vehicle and cause unnecessary delays. Similarly, a driving simulation system may introduce errors or modify log data as a way of simulating real-world errors within the perception and prediction systems of a simulated autonomous vehicle. However, if the data errors introduced within simulations are too large or too small, the resulting simulations may be unhelpful or unrealistic for evaluating the responses of the control systems of a simulated vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
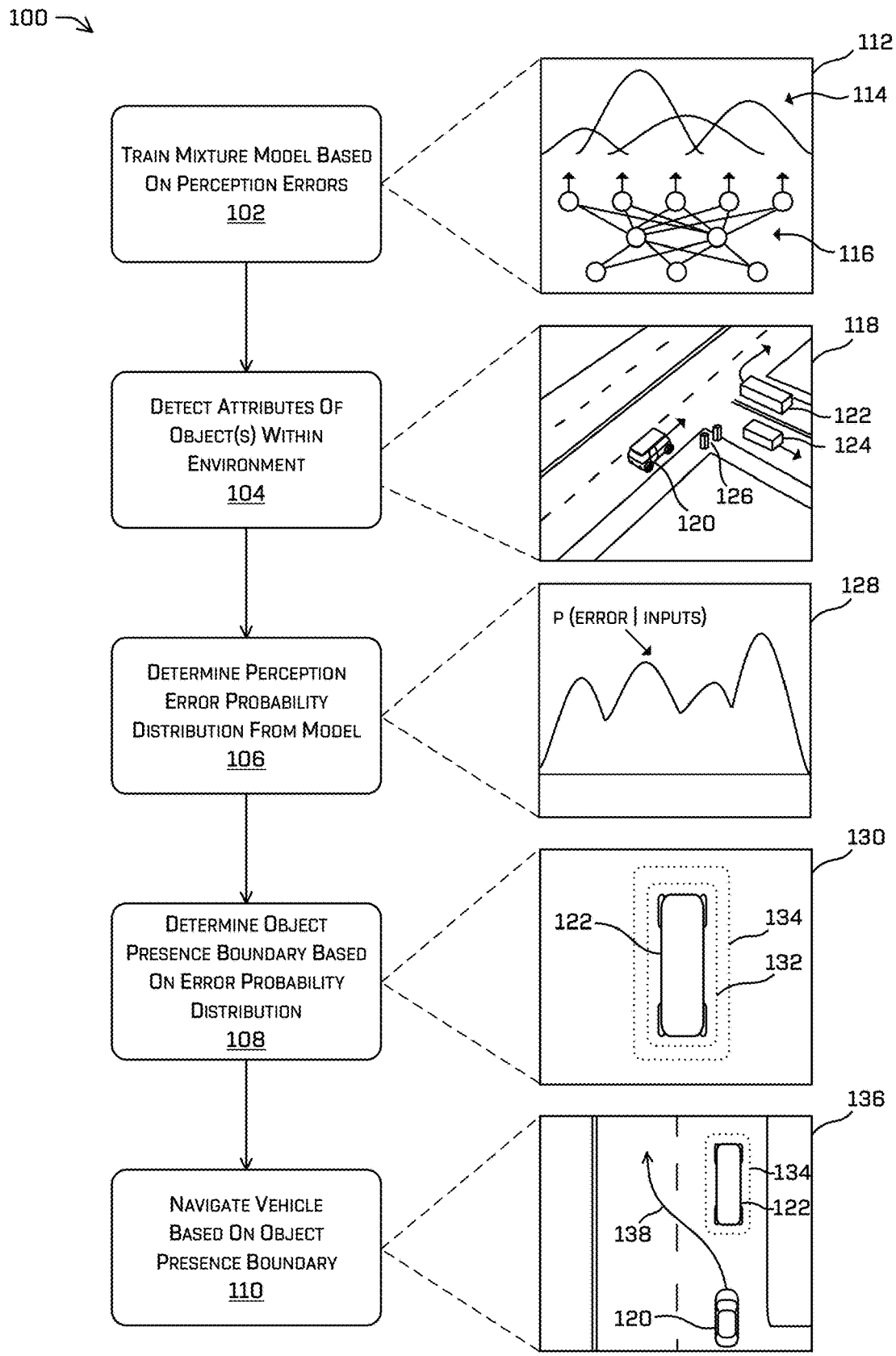
FIG. 1 illustrates an example process of determining and using a perception error probability distribution for an object detected in an environment, in accordance with implementations of the disclosure.

As discussed above, existing error modeling techniques are prone to produce inaccurate and unrealistic error values. This application relates modeling techniques to determine accurate and reliable probability distributions for perception error. For objects detected in an environment, attributes such as position, size, pose, and velocity are collected for the objects. A model is trained to learn the error distributions for these attributes as a function of input features such as the object class, distance from the hero to the agent, and percentage occluded of the detected objects. The object attributes and input features are provided to the trained model (e.g., a mixture density network) to determine joint error probability distributions for the attributes. The perception error probability distributions may be used online to control the vehicle, to generate or analyze simulations, for log mining and/or to perform collision analyses based on log data.

As an autonomous vehicle navigates through a physical environment, it may use a perception system based on sensor data to detect other objects in the environment, a prediction system to track and predict the decisions and movement of the other objects, and a planning system to determine actions and plan a path for the autonomous vehicle. For example, while navigating along a planned path from the current location to a destination location, an autonomous vehicle may encounter dynamic (e.g., vehicles, pedestrians, animals, and the like) and/or static (e.g., buildings, signage, parked vehicles, and the like) objects in the environment. A perception system of the autonomous vehicle may use LIDAR, RADAR, time-of-flight, and/or image data captured by sensors of the vehicle to detect the presence of various static and dynamic objects in the environment, and to determine relevant attributes associated with the objects. For instance, when another vehicle is detected in the environment, the perception system of the autonomous vehicle may use sensor data to determine the object classification of the vehicle, the size, position, pose (e.g., roll, pitch, and/or yaw), and velocity of the other vehicle. These attributes, along with various other data, may be analyzed to predict a likely behavior and course of the other vehicle, so that the autonomous vehicle may select optimal decisions and routes through which to traverse the environment.

In order to ensure the safety of occupants of the vehicle and the objects in the environment, the decisions and reactions of the autonomous vehicle to events and situations that the vehicle may encounter are modeled and simulated in a variety of driving conditions and scenarios. Due to sensor errors and inconsistencies, occlusions, and changing driving environments, the systems of the autonomous vehicle may assume that the perception data representing the objects in the environment includes certain errors or inaccuracies. Without such an assumption, any errors or inaccuracies in the perception data may result in a potential collision or navigation error by the autonomous vehicle. Further, the predictions made by the prediction system of the autonomous vehicle relating to future decisions and movements of the other objects are likely to include additional errors or inaccuracies. The errors in perception data output by the perception system, and the prediction errors output by the prediction system, may affect the future state of the environment and also may present challenges in navigation and decision-making by the autonomous vehicle.

To address these challenges, conventional systems in autonomous vehicles may assume certain error values or rates associated with perception data and/or prediction models. Assumptions of error values or rates may be based on percentages of sensor values (e.g., a 5% error, 10% error, etc.) or may be modeled based on a normal distribution (e.g., plus/minus standard deviation, two standard deviations, etc.). An assumed error value may be used to determine a safety buffer around detected objects in the environment. As an example, a conventional autonomous vehicle system that detects a parked car 100 feet away may introduce a safety buffer of 2% of the distance to the vehicle (e.g., 2 feet), and may determine a navigation route that avoids the safety buffer associated with the parked car. Within simulation systems, conventional solutions may include introducing errors by perturbing simulation data to mimic the occurrence of perception data errors within the sensors or perception system of the autonomous vehicle. The error values introduced in simulations may be determined based on percentages of the sensor data, sampled from a normal error distribution or chosen randomly, and simulation systems may use such error values when executing simulations and/or generating new synthetic scenarios.

However, these conventional techniques fail to accurately represent or effectively model perception data errors within autonomous vehicles. For instance, when a perception system of an autonomous vehicle outputs an inaccurate object attribute (e.g., size, position, pose, velocity, etc.), the other vehicle systems often cannot determine definitively that the perception data is inaccurate, nor can they determine a precise magnitude or direction of the error. Such perception data errors are not constant or random values, and cannot be double-checked in real-time environments. Therefore, estimating the error as a single value (e.g., 2 feet), even if that value represents a possible or likely error amount, may provide less utility than analyzing the range of potential error values in an error probability distribution. Further, probability distributions of perception data errors do not comport with normal distributions, and thus sampling from a normal distribution to estimate error values is likely to result in inaccurate and unrealistic error values. As a result, autonomous vehicles relying on conventional techniques for estimating perception data error may generate safety buffers or other error-based features that are too big or too small. Similarly, simulation systems relying on conventional techniques may introduce unrealistic error data into new and existing simulations, resulting in less valuable simulations.

The techniques described herein use model training systems and error estimation components to address the technical challenges of realistically estimating data errors within perception and prediction systems of autonomous vehicles. For attributes of objects detected in an environment, such as the object position, size, pose, and velocity, modeling techniques may be used to output error probability distributions for the object attributes. Within an error probability distribution, a range of different error values is represented, in which each error value is associated with a probability. In some examples, machine learning techniques are used to train models to output error probability distributions as a function of additional input features, such as the distance between the object and the autonomous vehicle, the object classification, and the occlusion percentage associated with the sensor data captured for the object. In some examples, mixture density networks are used which use neural network architectures to provide the parameters for a mixture model of probability distributions.

Additionally, in some examples the modeling systems and techniques described herein may output joint error probability distributions associated with multiple object attributes. Joint probability distributions may be applied in systems when perception errors across different object attributes (e.g., position, size, pose, velocity, etc.) are not independent but rather correlate and/or depend on errors of other object attributes. For instance, a perception error in the size of an object detected in an environment may correlate with other perception errors in the position, pose, and/or velocity of the same object. In such examples, because the errors in the object attributes are not independent, the modeling techniques may output joint error probability distributions in which each intersection (or point) in the distribution corresponds to a combination of different error values for different attributes. For instance, a mixture density network may output a joint error probability distribution in which each intersection represents a unique combination of error values for the size, position, pose, and/or velocity of an object, and in which each intersection includes a probability corresponding to the unique combination of error values.

The modeling systems and techniques described herein may be used in performing various actions by autonomous vehicles operating in a physical environment, by simulation systems generating or executing driving systems, and/or by data analytics systems analyzing log data. For instance, a mixture model may execute online within an autonomous vehicles, to determine perception error probability distributions that may be used by the prediction and planning systems of the autonomous vehicles to select an action for the vehicle to perform and/or to determine a particular trajectory or route for the vehicle to follow in accordance with the selected action. In other examples, simulation systems may use the error probability distributions to generate new simulations and/or modify existing simulations by introducing potential perception data errors into a simulation, and determining the effect on the autonomous vehicle systems being evaluated in the simulation. In still other examples, the perception error probability distributions generated herein may be used to analyze the impact of perception errors on collision probabilities and passenger/vehicle safety metrics.

Although the techniques described herein relate to modeling perception data errors, similar or identical techniques may be used to model prediction errors output by a prediction system of an autonomous vehicle. As noted above, an autonomous vehicle may include a perception system to detect objects in an environment and output object attributes such as object classification, position, size, and velocity, while a prediction system may be used to predict the behaviors and trajectories of the objects detected by the perception system. Certain techniques described herein may relate to modeling of perception data errors, other techniques may relate to model of prediction errors, and still other techniques may relate to combined modeling of perception/prediction errors. For instance, the general amount of confidence in the perception data may affect the predictions output by the prediction system, as well as the vehicle actions and routes determined by the planning system.

Additionally, mixture models may be trained based on combinations of perception error and prediction error, which provide the planning system improved estimates of the confidence associated with the underlying perceptions of objects and agent predictions, thereby allowing the planning system to make improved risk-based decisions and route selections.

FIG. 1 illustrates an example process 100 of training and using mixture models to determine perception error probability distributions for autonomous vehicles. In some examples, some or all of example process 100 may performed by various components of a model training system, autonomous vehicle, and/or simulation system, described in more detail below.

At operation 102, a model training system may train a model configured to output error probability distributions based on perception data associated with objects and/or input features detected by a perception system. As noted above, the perception system may include hardware and/or software components configured to detect objects within an environment. A perception system may operate within an autonomous vehicle operating in a physical environment, within a simulation system providing a virtual environment, or as a standalone system in a separate computing environment.

In some examples, a machine-learned model may be constructed to receive input data representing one or more attributes of objects detected by the perception system. Such object attributes may include, for example, the object classification (e.g., car, truck, bicycle, motorcycle, pedestrian, building, mailbox, street sign, etc.) along with the position, size, pose, and/or velocity of an object detected by the perception system within an environment. As discussed below, additional inputs to the model may include data associated with the autonomous vehicle and/or the object relative to the autonomous vehicle, such as the velocity of the autonomous vehicle, the distance between and/or angle of movement between the autonomous vehicle and the object, and the occlusion percentage of any sensor data captured by the perception system of the object. The outputs of the model may include error values associated with any of the object attributes input to the model.

In some examples, a model training system may train the model in operation 102 using ground truth data to provide precise measurements of erroneous or inaccurate data output by the perception system. For instance, the model training system may provide library of labeled images to the perception system for analysis, and may compare the outputs of the perception system (e.g., the attributes of the objects data) to the known object attributes from the labeled images, to determine the errors within the outputs of the perception system.

Additionally or alternatively, the model training system may train the model in operation 102 using log data collected by sensors of an autonomous vehicle traversing through a physical or virtual environment. In such cases, ground truth data might not be discernable from the log data. As a result, the model training system may analyze multiple log data for an object attribute at consecutive points in time to determine the perception system output errors. As an example, if the recorded height measurements for an object at consecutive times in the log data are ($t_0$=1.4 meters, $t_1$=1.4 meters, $t_2$=6.7 meters, $t_3$=1.4 meters), then the model training system may analyze the different height measurements (along with the other log data) to determine that the height measurement of 6.7 meters at time $t_2$ is erroneous and the accurate object height at that time was 1.4 meters. As another example, if the recorded velocity measurements for an object at consecutive times in the log data are ($t_0$=18.4 mph, $t_1$=18.7 mph, $t_2$=19.1 mph, $t_3$=55.7 mph), then the model training system may analyze the different velocity measurements (along with the other log data) to determine that the velocity measurement of 55.7 meters at time $t_3$ is erroneous and the accurate object velocity at that time was approximately 19.4 mph. Thus, in various implementations the model training system may use ground truth data (e.g., labeled images), log data, or a combination of ground truth and log data, to train the model with perception error data.

In some implementations, the trained models used to output probabilities distributions of perception errors may include mixture models. The use of mixture models may be advantageous for examples in which the perception errors are not normally distributed. As an example, a perception system detecting an object (e.g., a bicycle) a medium distance away from the autonomous vehicle (e.g., 30 meters) may output several possible erroneous size measurements for the object in various situations, including both small and large errors. For instance, depending on the driving conditions and various environmental factors, the perception system may have a relatively high probability of overestimating the size of the object by 80% and also a relatively high probability of underestimating the size of the object by 50%, but may have a relatively low probability of over—or underestimating the size of the object by 10-40%. In this example, the perception error probability distribution for the object size may be bimodal rather than normally distributed, and an attempt to model the perception error using a normal distribution would result in a highly inaccurate model that does not closely fit the distribution of errors actually produced by the perception system.

Various techniques described herein thus determine a non-normal Gaussian mixture model to model the perception error probability distribution. In some examples, the probability distribution of perception error may be represented as a bimodal, trimodal, or other multi-modal distribution, in which case the model is a mixture model of two or more components where each component is modeled as Gaussian distribution. In some cases, Gaussian mixture models also may include unimodal distributions, for instance, when multiple high-probability regions of perception error have significant overlap. In such cases, the Gaussian mixture models may be unimodal rather than multi-modal, but are not symmetric or normally distributed.

A simplified example of a model training process 112 is shown in association with operation 102. In this example, the trained model is a Gaussian mixture model 114 based on multiple different Gaussian distributions corresponding to different high-probability perception error regions. In this example, the model training process 112 also illustrates use of a mixture density network in which a neural network 116 provides the parameters for the Gaussian mixture model 114. Mixture density networks, described in more detail below, receive and process input parameters via a neural network 116, which outputs the mixture parameters (e.g., mean values, standard deviations, and mixing coefficients) for multiple distributions which are mixed by weights. The resulting Gaussian mixture model 114 is a multi-model perception error probability distribution that enables the model training system to model complex patterns of perception errors produced by various perception systems in different environments.

At operation 104, a perception system associated with an autonomous vehicle is used to detect attributes for an object within an environment. In some examples, operation 104 is performed by a perception system operating within an autonomous vehicle traversing a physical environment. In other examples, the perception system may be executed within a simulation system or other software testing environment. Additionally or alternatively, the data received at operation 104 may include log data and/or sensor previously captured by a vehicle operating in a real or simulated environment, and stored in log data stores for future analyses (e.g., collision probability analyses).

An example of simplified environment 118 is shown in association with operation 102. In this example, an autonomous vehicle 120 driving within the environment 118 includes various sensors and a perception system to detect and analyze other static and dynamic objects in the environment. As the autonomous vehicle 120, which may be real or simulated, operates within the (real or simulated) environment 118, the perception system detects additional objects (e.g., vehicle 122, vehicle 124, and pedestrian 126) proximate to the autonomous vehicle 120 in operation 104. For each object detected in the environment, the perception system may use a variety of sensor data and processing techniques to determine values for a number of attributes of the object, such as the object classification (or type), position, size, pose, and velocity of the object. As described below, the perception system may calculate object attributes at multiple time intervals, and thus an individual attribute potentially may have different values at different times due to perception system errors or to actual changes in the attribute for the object.

In addition to determining object attributes in operation 104, the perception system also may determine characteristics associated with the autonomous vehicle 120, such as the current position of the vehicle, the velocity, pose, pose, etc., at time(s) corresponding to the times at which the perception system determines the object attributes. Additionally or alternatively, the perception system also may determine characteristics associated with the relationship between the autonomous vehicle and other objects in the environment, such as the distance between the autonomous vehicle 120 and an object (e.g., vehicle 122), the relative velocity and/or relative angle of movement between the vehicle and the object, any occlusions between the vehicle and an object, etc.

At operation 106, the model trained in operation 102 is used to output a perception error probability distribution, based on the object attributes determined in operation 104. As noted above, based on a particular set of input attributes for an object (e.g., size, position, pose, velocity) and additional input features (e.g., object classification, distance to object, occluded percentage, etc.), the model may output not a single error value but an error probability distribution associated with the input attributes. For instance, rather than outputting a single velocity error value (e.g., N-mph), a single position error value (e.g., N feet), the trained model may output a range of multiple possible error values with corresponding probabilities for each error value. In some cases, the trained model output may include an equation defining the conditional probability of the perception error, based on the inputs (e.g., perceived object attributes and input features). An example of an error probability distribution 128 is shown in association with operation 102.

In some examples, the trained model may be a mixture model in which the perception error probability distribution is a non-normal distribution. In such examples, the perception error probability distribution 128 may be determined based on a number of separate mixture components, each of which may include a separate distribution defined by mixtures parameters, and mixing parameter conditioned on the input values that weights the separate distributions. Additionally, the perception error probability distribution 128 may be a joint distribution in some cases, in which each point of the error probability distribution 128 represents an intersection (or multi-dimensional vector) containing values for multiple different attributes of the object. By way of example, if the object velocity perception error depends on object size perception error, then the error probability distribution 128 may include a first intersection representing a first probability of a first size error and a first velocity error occurring together, a second intersection representing a second probability of the first size error and a second velocity error occurring together, a third intersection representing a third probability of a second size error and the first velocity error occurring together, and so on. In various implementations, the model training system may generate, train, and use models configured to output perception error probability distributions independently for each attribute of an object, and/or models configured to output joint probability distributions of perception errors for any combination of correlated or dependent attributes.

At operation 108, an autonomous vehicle (or simulation system) may use the perception error probability distribution to determine an object presence boundary for the object detected in operation 104. The object presence boundary (or contour line) may be represented as an imaginary line generated by the autonomous vehicle that surrounds and/or encompasses an object detected in the environment. The precise location and shape of a contour line may correspond to the probability that the object inhabits the physical space at the boundary. For instance, an example image 130, shown in association with operation 108, depicts a top-down representation of a vehicle 122 and two separate contour lines 132-134 surrounding the vehicle 122. Contour lines such as 132 and 134 acknowledge the possibility that the perception system may output erroneous or other inaccurate data, and therefore that the actual location of vehicle 122 is different from the perceived representation of vehicle 122 shown in image 130. In this example, the first object presence boundary 132 is closer to the vehicle 122 than a second object presence boundary 134, indicating that each point on the first object presence boundary 132 has a higher probability of being inhabited by the vehicle 122 than each point on the second object presence boundary 134. The first object presence boundary 132 may be referred to a 99% probability boundary, indicating that when the autonomous vehicle 120 (or any other object) passes just outside the first object presence boundary 132, it has a 99% likelihood of avoiding a collision with the vehicle 122. Continuing with this example, the second object presence boundary 134 may be a 99.9% probability boundary, indicating that when the autonomous vehicle 120 passes just outside the second object presence boundary 134, it has a 99.9% likelihood of avoiding a collision with the vehicle 122.

As described below in more detail, the model training system and/or model training system may use the perception error probability distributions determined in operation 106 to generate a number of object presence boundaries (or contour lines) surrounding an object, which may correspond to different confidence levels. Top-down representations of a scenario may be used to generate object presence boundaries in some instances. For instance, the representation of the vehicle 122 in image 130 may be based on determinations by the perception system of the position, size, and shape of the vehicle 122, while the dimensions of the object presence boundaries 132-134 surrounding the representation of the vehicle 122 may be a based on the perception error probability distribution(s) for the same or similar attributes (e.g., position, size, shape, velocity, etc.) of the object. In general, greater error probabilities and wider error probability distributions for the position, size, pose, and velocity of an object may result in larger object presence boundaries, while smaller error probabilities and/or narrower error probability distributions for the object attributes may result in smaller object presence boundaries.

Additionally or alternatively, probability heat maps may be used to represent the likelihood that the actual position, size, and shape of an object (e.g., vehicle 122) does not precisely match the position, size, and shape of the object as perceived by the perception system. For a probability heat map, the model training and/or execution systems may determine a probability value for each region of space surrounding a representation of an object in an environment, where each probability value represents the likelihood that the perceived size, shape, and/or location of the object is in error and that the actual object inhabits that particular region of space surrounding the representation of the object.

Further, although the object presence boundaries and probability heat maps described in the above example may relate to a single time representing the current moment, the model training system and/or related systems may generate object presence boundaries and probability heat maps for future times. As described below, future object presence boundaries and/or probability heat maps for an object may be based the current presence boundaries/probability heat maps for the object, as well as predicted track of the object (e.g., from a prediction system) and the error probabilities associated with the predicted track.

Then, at operation 110, the autonomous vehicle (or simulation system) may determine and execute a navigational route based on the object presence boundaries for the object determined in operation 108. For example, image 136 shown in association with operation 110 depicts a top-down representation of the autonomous vehicle 120, the vehicle 122, and a selected route 138 for the autonomous vehicle 120 based on an object presence boundary 134 associated with the vehicle 122. In some instances, the autonomous vehicle 120 may determine and generate a particular object presence boundary based on a collision risk tolerance level. In this example, the object presence boundary 134 may correspond to a 99.9% probability that the vehicle 122 is not present outside of the boundary, meaning that the autonomous vehicle 120 has a <0.01% chance of collision as long as the route 138 of the autonomous vehicle 120 remains outside of the object presence boundary 134. In other examples, the autonomous vehicle 120 may be configured with a higher or lower collision risk tolerance, which may cause the system to determine a larger or smaller object presence boundary. After generating and/or selecting an appropriate object presence boundary 134 based on the collision risk tolerance of the autonomous vehicle 120, the planning system of the autonomous vehicle 120 may determine an optimal route that does not intersect with the object presence boundary 134 of the vehicle 122. The autonomous vehicle 120 may use similar or identical techniques to determine and navigate around the object presence boundaries for other objects in the environment, as well as future predicted presence boundaries for the objects in the environment. As discussed below, a future predicted presence boundary for an object may be based on a combination of the perception error probability distribution(s) for the object, and the error probabilities associated with a track prediction for the object made by a prediction system of the autonomous vehicle.

In the above example, operations 108-110 relate to an autonomous vehicle using the perception error probability distribution(s) to determine object presence boundaries and navigation routes for the autonomous vehicle through an environment. However, in other examples, the perception error probability distribution(s) determined in operation 106 for real or simulated autonomous vehicles, may be used to perform various other actions associated with the autonomous vehicles. For instance, the perception error probability distribution(s) may be analyzed and used to determine a vehicle control action to be performed by the autonomous vehicle, such as the activation of a collision avoidance system (CAS) or a remote teleoperations computing device at the autonomous vehicle. In such cases, the prediction system and/or planning system of the autonomous vehicle may analyze the perception error probability distribution(s) to determine the likelihoods associated with different possible perception errors, and/or the overall confidence level associated with the perception data, and based on the analysis may weight a calculation in favor of activating a CAS or teleoperations system.

In other examples, the perception error probability distribution(s) determined in operation 106 may be used to generate and perform new simulations for testing and evaluating the responses of the vehicle control systems. For example, a simulation system may sample from the error probability distribution to determine sets of object attribute data to be used in subsequent simulations. By sampling from the error probability distribution, the object attribute data used to create new synthetic simulations may provide more realistic simulations by using combinations of object attribute values that are relatively more likely to be output by the perception system.

In still other examples, the perception error probability distribution(s) determined in operation 106 may be used to analyze log data previously captured by autonomous vehicles while traversing through physical environments and/or during previous simulations. In such examples, the log data may be analyzed to perform collision analyses in which collision probabilities are calculated based on the log data using perception error probability distributions. In some cases, the previously captured log data may be analyzed, and the perception error probability distributions may be used to compare different versions of vehicle software systems (e.g., perception systems, prediction systems, planning systems, etc.) which respect to safety, collision probability, route optimization, or other performance metrics.

As illustrated by the various features and examples described herein, the techniques discussed herein for modeling perception error probability distributions may provide technical advantages over conventional systems. For instance, the systems and components of autonomous vehicles may analyze the perception error probability distributions to determine confidence levels associated with the perception data, and the likelihood of various different perception data errors. Such analyses of the error probability distributions may provide advantages for the autonomous vehicle of improved navigation and vehicle decision-making, as well as improved safety and reduced collisions. Regardless of the number or magnitude of the perception errors output by the perception system, the techniques described herein may improve autonomous vehicle safety and performance by modifying the subsequent prediction and planning operations performed on the vehicle to take into account the probability distribution of the perception errors. The techniques described herein also may improve the generation and execution of driving simulations, by using the perception error probability distributions to select more realistic simulation data. Further, the techniques described herein also may improve processes for evaluating log data using the perception error probability distributions to determine collision and safety metrics such as miles per collision, injury or fatality estimations, and the like.

Figure 2:
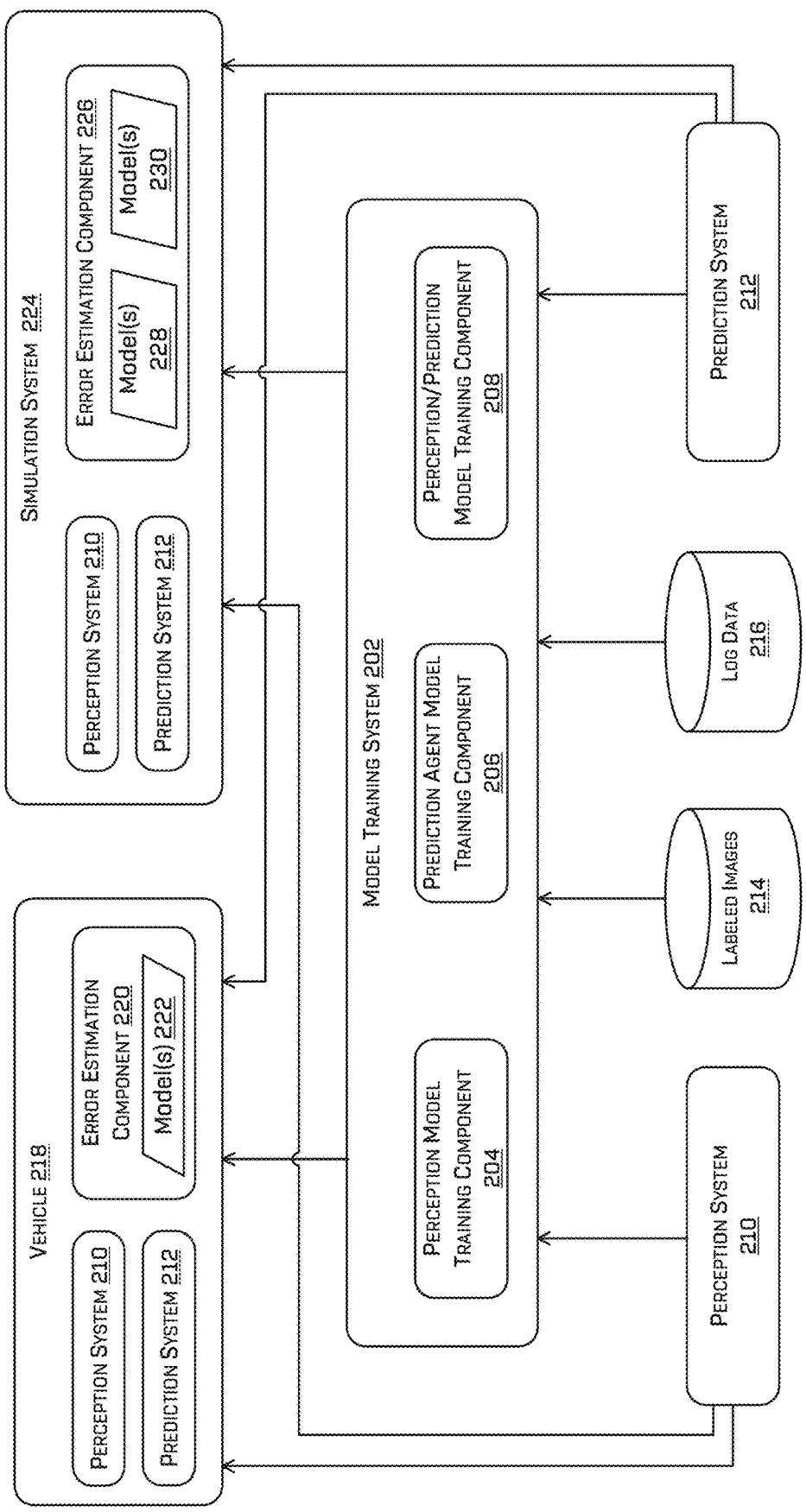
FIG. 2 is a block diagram illustrating an example architecture of a system for training and using models configured to determine perception error probability distributions, in accordance with implementations of the disclosure.

FIG. 2 is a block-diagram illustrating an example architecture 200 including one or more systems configured to train and use machine-learned models for determining perception error probability distributions associated with objects detected in an environment. In this example, the architecture 200 includes a model training system 202 including a perception model training component 204, a prediction agent model training component 206, a perception/prediction model training component 208. As discussed below in more detail, the model training system 202 may generate and train various types of machine-learned models, including mixture density networks (MDNs) and other mixture models, to output error probability distributions associated with the perception data representing objects detected in an environment. For any dynamic objects detected within the environment, such as vehicles, pedestrians, bicycles, animals, etc., the models generated by the model training system may determine error probability distributions associated with object attributes such as the position, size, pose, or velocity of the object. As shown in this example, the perception model training component 204 may generate one or more model(s) configured to output error probability distributions associated with the perception data output by a perception system 210. The prediction agent model training component 206 may generate one or more separate model(s) configured to output error probability distributions associated with the object track predictions output by the prediction system 212. The perception/prediction model training component 208 may generate additional model(s) configured to output error probability distributions associated with combined perception data and prediction data output respectively by the perception system 210 and prediction system 212.

In some implementations, the model training system 202 may train machine-learned models to output perception error probability distributions based on ground truth data, which may include a repository of labeled images 214. In such examples, the labeled images 214 may include scenes of environments having various objects that may be detected and identified by a perception system 210. Each of the labeled images 214 may include metadata associated with the labeled image identifying each object and various object attributes (e.g., classification, size, position, distance away from the vehicle, etc.). The model training system 202 may input the labeled images 214 into the perception system 210, and may calculate the differences between the object attributes output by the perception system 210 and the corresponding object attributes in the ground truth metadata associated with the labeled images 214, to determine the perception error associated with the attribute of each object within each labeled image. The individual perception errors output by the perception system 210 may be analyzed to determine a perception error distribution.

Additionally or alternatively, the model training system 202 may train the models to output based on log data 216. When training a model based on log data 216, in contrast to training based on labeled images 214, the model training system 202 might have only perception data previously captured by perception systems rather than ground truth data. In such cases, the model training system 202 may analyze the environments and objects represented in the log data 216 at multiple successive points in time to determine the most likely or optimal attribute values for the objects represented in the log data 216. In some instances, the model training system 202 may use trend analyses, outlier detection, and the like, to determine which of the object attributes in the log data 216 are likely to be accurate, and which are likely to be inaccurate/erroneous. Based on these analyses, the model training system 202 may identify a number of individual perception errors within the log data 216, and may use the individual perception errors to determine a perception error distribution. In various implementations, to train machine-learned models to output perception error probability distributions, the model training system 202 may use ground truth data (e.g., labeled images 214), log data 216, and/or a combination of ground truth and log data.

As discussed above, the model training system 202 may use the perception training data (e.g., labeled images 214 and/or log data 216) to generate and training a model configured to output perception error probability distributions. In some examples, the models may include mixture models having non-normal and/or multi-modal probability distributions of perception error. For instance, the models trained by the model training system 202 may include mixtures of two or more components each having separate Gaussian distributions, which may be combined based on mixture parameters.

In some examples, the model training system 202 may determine the perception error probability distribution(s) independent of any additional model input features. For instance, the error probability distribution for any attribute (e.g., object position, object size, object pose, object velocity, etc.) may be determined partially or entirely based on the perception training data related to that attribute. However, in some cases, the model training system 202 may use further model the error probability distributions as joint probability distributions in which a single distributions models perception data errors for multiple dependent attributes. As an example, if the distribution of perception error for the object size attribute is dependent on perception errors in object classification (or vice versa), then the model training system may train a joint error probability distribution to model the perception errors associated with multiple attributes.

Additionally or alternatively, as discussed above the model training system 202 may use further machine-learning techniques to model the perception error probability distributions as a function of various model input features. The model input features may be derived from the perception data, and may include the object attributes for which error distributions are being modeled (e.g., object position, size, pose, velocity, etc.), and/or may include input features based on additional perception data relating to the object, the autonomous vehicle, or the relationship between the object and the autonomous vehicle. As an example, the model training system 202 may determine a perception error probability distribution as a function of the object classification, the distance between the autonomous vehicle and the object, and/or the occlusions (e.g., an occluded percentage) associated with the sensor data captured by the autonomous vehicle of the object. The model training system 202 may use machine-learning techniques to determine the extent to which the model input features, individually or in combination, effect the error probability distributions. To illustrate, the perception error for an attribute (e.g., object size) may have one probability distribution when the object is of a particular class (e.g., vehicle), autonomous vehicle is relatively near the object, and there are no occlusions effecting the sensor data captured by the autonomous vehicle of the object. However, the perception error for the same attribute may have different error probability distributions for different combinations of object classifications, distance ranges between the autonomous vehicle and the object, and/or occlusion percentages sensor data captured by the autonomous vehicle of the object.

Figure 3:
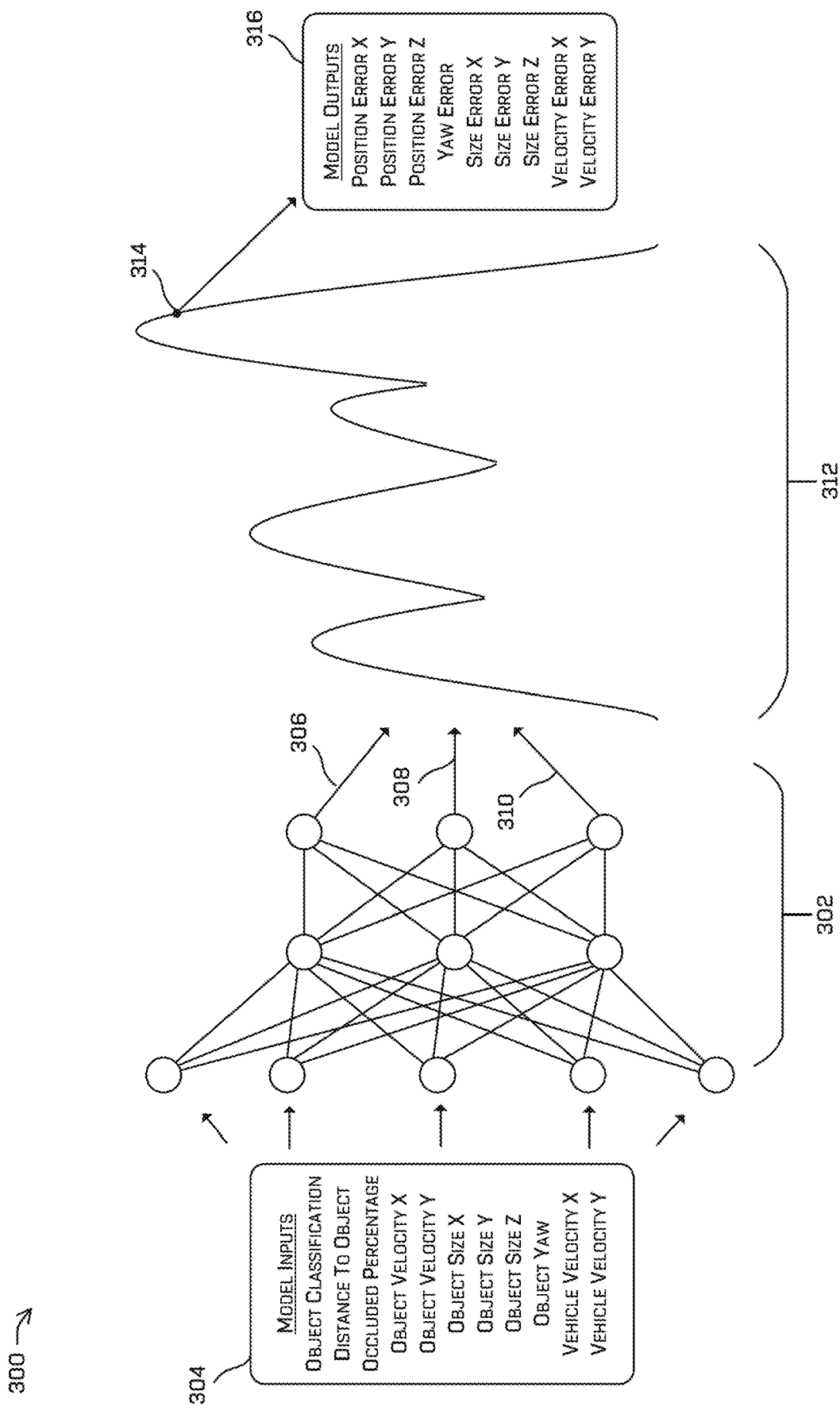
FIG. 3 is a diagram illustrating an example model architecture including a neural network configured to output mixture parameters associated with a mixture model, in accordance with implementations of the disclosure.

Referring now to FIG. 3, an example model architecture is shown implemented as a mixture density network (MDN) 300, that is configured to output error probability distributions based on perception data including object attributes and additional model input features. As shown in this example, the MDN 300 includes a trained neural network 302 that receives model input data 304 and outputs a set of mixture parameters 306-310. The mixture parameters may include, for example, a mixing coefficient 306, and the mean(s) 308 and standard deviation(s) 310 that define one or more Gaussian distributions. The mixture parameters may be used to define the mixture distribution 312, which as discussed above may include a non-normal and/or multimodal distribution. The mixture distribution 312 may correspond to a set of perception error probabilities, so that each point 314 (or intersection) of the mixture distribution 312 may represents a unique set of output error values 316.

As shown in this example, the model input data 304 to the MDN 300 may include the following data fields, which may be received from a perception system 210 for a particular object detected in the environment: Object Classification (e.g., car, truck, motorcycle, bicycle, pedestrian, etc.), Distance To Object (e.g., distance between the autonomous vehicle and the object), Occluded Percentage (e.g., percentage of sensor data captured by the autonomous vehicle for the object that is occluded), Object Velocity X (e.g., velocity in the X direction), Object Velocity Y (e.g., velocity in the Y direction), Object Size X (e.g., length of object), Object Size Y (e.g., width of object), Object Size Z (e.g., height of object), Object Yaw, Vehicle Velocity X (e.g., autonomous vehicle velocity in the X direction), and Vehicle Velocity Y (e.g., autonomous vehicle velocity in the Y direction). Based on these inputs, the MDN 300 may output one or more probability distributions representing the following output error values 316: Position Error X (e.g., an X-direction error in the perceived position of the object), Position Error Y (e.g., a Y-direction error in the perceived position of the object), Position Error Z (e.g., a Z-direction error in the perceived position of the object), Yaw Error, Size Error X (e.g., an X-direction or length error in the perceived size of the object), Size Error Y (e.g., a Y-direction or width error in the perceived size of the object), Size Error Z (e.g., a Z-direction or height error in the perceived size of the object), Velocity Error X (e.g., an X-direction error in the perceived velocity of the object), and Velocity Error Y (e.g., a Y-direction error in the perceived velocity of the object).

Referring again to FIG. 2, after the model training system 202 generates and/or trains one or more models configured to output perception error probability distributions, the model training system 202 may provide the trained models to one or more devices or systems configured to use the models to perform various operations based on the error probability distributions. As shown in this example, a vehicle 218 may include an error estimation component 220 that uses one or more model(s) trained to output perception and/or prediction error probability distributions. In this example, the vehicle 218 may be configured to receive and execute one model 222, a combined perception/prediction error distribution model 222 generated by the perception/prediction model training component 208. The error estimation component 220 may execute the trained model(s) 222, using input data received from the perception system 210 and/or prediction system 212 running on the vehicle 218, and may use the output of the model 222 to perform various actions on the vehicle 218. Such actions may include determining (or weighting in favor of) a subsequent vehicle control action, and/or determining a navigation route for the vehicle 218.

Additionally or alternatively, the model training system 202 may provide one or more trained models to a simulation system 224. The simulation system 224 may include an error estimation component 226 configured to execute models 228 and 230. As shown in this example, the simulation system 224 may be configured to receive and execute two separate models: a perception error distribution model 228 generated by the perception model training component 204, and a prediction agent distribution model 230 generated by a prediction agent model training component 206. In this example, the error estimation component 226 may execute both model 228 and model 230 to separately determine perception error distribution and prediction error distribution, and may analyze the outputs of both models to determine an action to be performed on the simulation system 224. Such actions may include generating new simulations and/or synthetic scenarios to be executed on simulation system 224, by sampling from the error distributions to determine high probability perception and/or prediction errors.

As described herein, a neural network may refer to an algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters. Although discussed in the context of MDNs including deep neural networks, any type of machine learning can be used consistent with this disclosure. For example, any of the trained models described herein may be based on machine learning algorithms that can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

Figure 4:
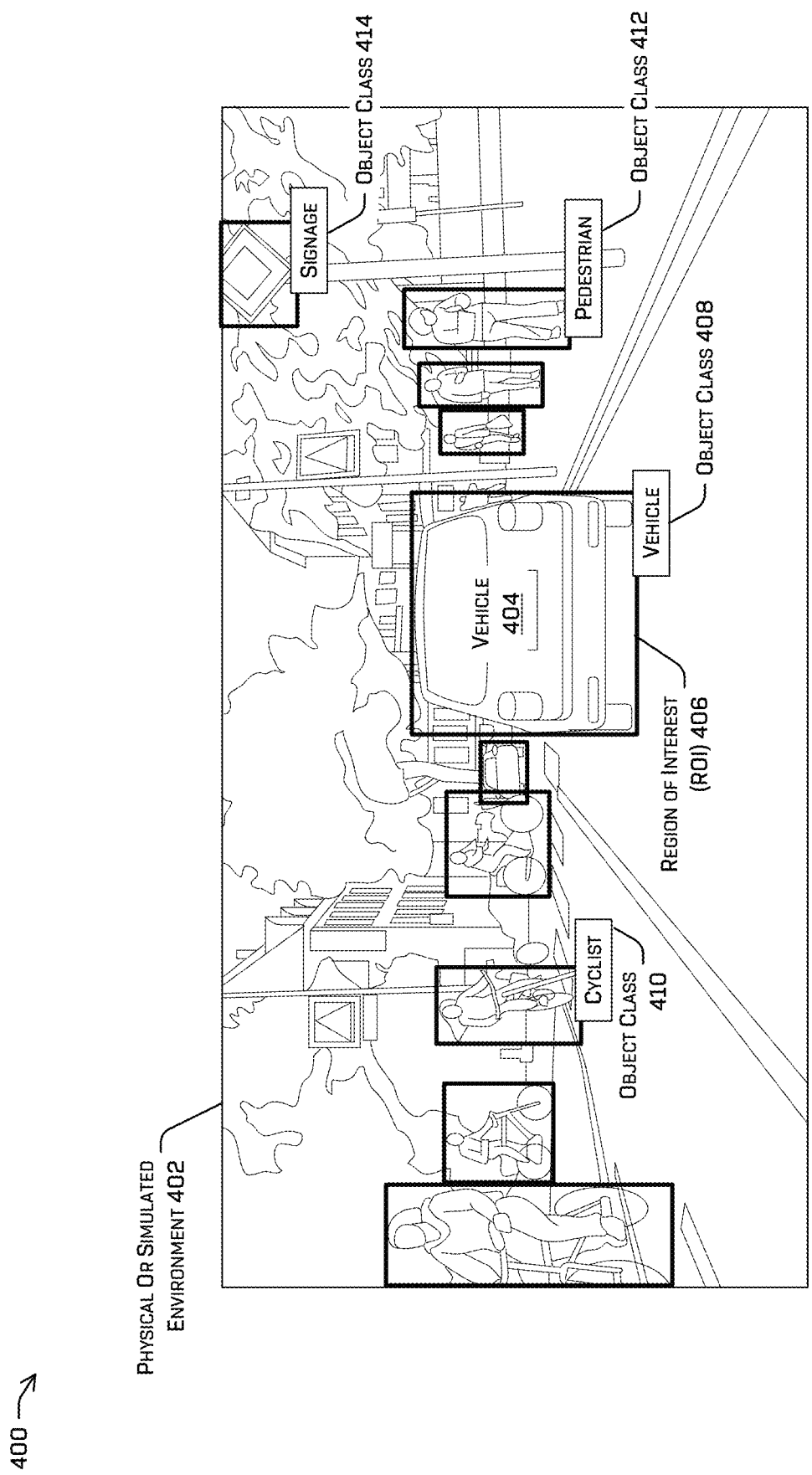
FIG. 4 depicts an example scenario in which an autonomous vehicle detects and identifies multiple other objects within the environment, in accordance with examples of the disclosure.

FIG. 4 depicts an example scenario 400 in which a perception system associated with an autonomous vehicle detects and identifies multiple objects in an environment 402. In various examples, the environment 402 may represent a physical environment perceived by a perception system 210 within a vehicle 218, a virtual environment perceived a perception system 210 executing within a simulation system 224 or other software environment. A perception system 210 operating within any of these computing systems or environments may detects multiple objects in the environment 402 surrounding the real or simulated vehicle from which sensor data is collected by sensors to generate the perception data.

As noted above, a perception system 210 associated with a real or simulated vehicle 218 may receive sensor data from sensor(s) of the vehicle 218. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, and/or bariatric or other environmental signals, etc. In this example, environment 402 may represent image data collected by cameras/image sensors the vehicle 218, while in other examples the environment 402 may represent sensor data based on LIDAR and/or RADAR sensors (e.g., a point cloud including points that represent an object).

In this example, a perception system 210 of a vehicle 218 may perceive image data (and/or other sensor data) of the environment 402, which includes a representation of a vehicle 404, multiple cyclists, multiple pedestrians, multiple signage objects, and a variety of different environmental objects (e.g., roadway, sidewalk, trees, buildings). The perception system 210 may generate an ROI 406 based at least in part on detecting vehicle 404 as being represented in the environment 402. In the illustrated example, the ROI 406 is a bounding box, although other techniques for identifying the ROI are contemplated. FIG. 4 additionally depicts multiple other ROIs that may be generated by the perception system 210 for different objects that may be detected by the perception system 210, but, for simplicity and clarity, they are not all labeled. For example, the other ROIs identify cyclists, another vehicle, and traffic signage, although it is understood that additional or alternative portions of an image (and/or other sensor data) may be detected by the perception system 210.

In some examples, the perception system 210 may additionally or alternatively determine, by a first machine-learned (ML) model, an object class (or general classification) for each detected object in the environment 402. For example, the first ML model may be trained to output an indication of one classification, from among a plurality of object classifications, that corresponds with a highest probability determined by the ML model. In some examples, the object classifications may include labels associated with a top level of a hierarchy. The object classifications may include classifications such as, for example, "cyclist," "vehicle," "pedestrian," "animal," "environmental object," etc. In this example, the object classifications include object classification 408 "vehicle"; object classification 410, "cyclist"; object classification 412, "pedestrian"; and object classification 414, "signage". Although, for the sake of clarity, only a sampling of object classifications are depicted in FIG. 4, it is understood that the first ML model of the perception system 210 may determine object classifications for one or more of the ROIs and/or objects detected from the sensor data.

In some cases the object classification may be determined using a structure that includes the first ML model and one or more sub-class ML model(s). A sub-class ML model may be associated with a particular classification of the plurality of candidate classifications of the first model. For example, a first sub-class ML model may be associated with "pedestrian", a second sub-class ML model may be associated with "vehicle", and so on. Based at least in part on an output of the first ML model, the structure may select a sub-class ML and provide one or more outputs of the first ML model to the sub-class ML model as input. The sub-class ML model may determine a sub-classification associated with the object from among a plurality of candidate classifications.

In addition to detecting and identifying various objects within the environment 402, the perception system 210 also may analyze the sensor data to perceive various attributes for each of the objects depicted in the environment 402. For instance, for the vehicle 404 and the other vehicles in the environment 402, as well as the various bicycles, pedestrians, signage objects, other static objects, etc., the perception system 210 may use the sensor data to determine attributes such as object position and object size (e.g., in the X, Y, and Z dimensions), pose (e.g., object pitch, roll, and/or yaw), and velocity (e.g., in the X and Y directions).

As described above, a prediction system and/or planner system may use perception data depicted in environment 402, including the ROIs, object classifications, sub-classifications, and/or feature maps to generate instructions for predicting the track of various objects and/or for controlling operation of the vehicle 218. For example, a planner system may determine a route for the vehicle 218 from a first location to a second location, control the vehicle to traverse the route, and select one of the potential trajectories as a trajectory of the vehicle 218 that may be used to generate a drive control signal that may be transmitted to drive components of the vehicle.

Figure 5:
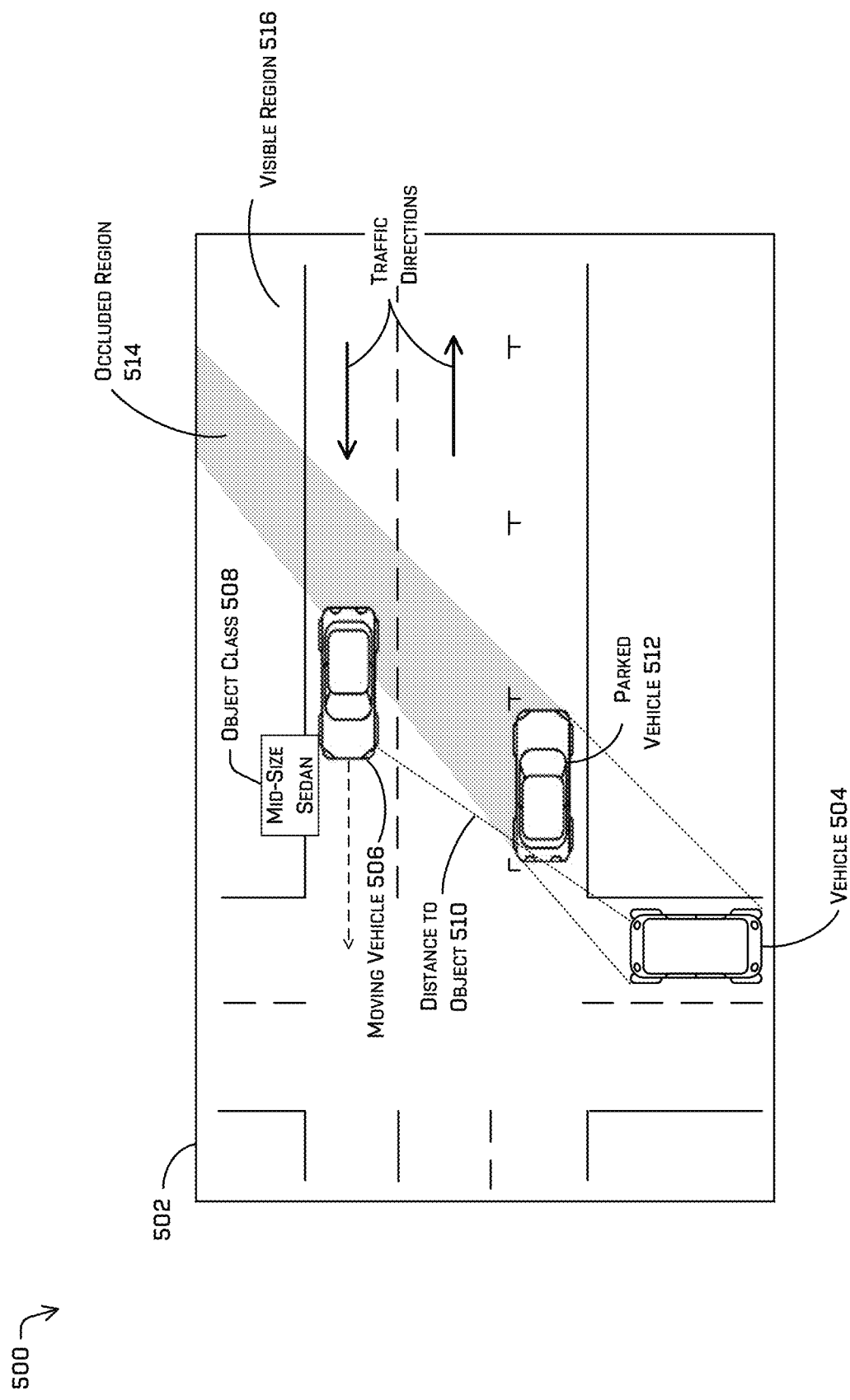
FIG. 5 depicts an example environment in which an autonomous vehicle identifies object attributes and model input features associated with another object in the environment, in accordance with examples of the disclosure.

FIG. 5 depicts a top-down representation of a scenario 500, including another environment 502 in which a vehicle 504 may detect objects, and identify object attribute and/or additional model input features based on the data output by a perception system of the vehicle 504. In some examples, the vehicle 504 may be an autonomous vehicle traversing the environment 502, the vehicle 504 including various internal sensor-based detection and decision-making systems, such as a perception system, prediction system, and planning system, as described above. As depicted in this examples, the perception system of the vehicle 504 has detected another moving vehicle 506. Using techniques described above (e.g., an object classification ML model), the vehicle 504 has determined an object class of "Mid-Size Sedan" 508 for the moving vehicle 506. Using LIDAR, RADAR, and/or image sensors, the perception system of the vehicle 504 also has determined a distance 510 between vehicles 504 and 506.

Environment 502 also depicts a separate parked vehicle 512, which creates a static occluded region 514 behind the parked vehicle 512. In some examples, the perception system of the vehicle 504 may determine an occluded percentage or ratio associated the moving vehicle 506, corresponding to the percentage/ratio of the moving vehicle 506 that is obscured from the sensors of the vehicle 504 by the parked vehicle 512. As described above, these additional perception data and various other perception data may be provided as input to the trained model. For instance, one or more perception error probability distributions associated with the moving vehicle 506 may be a function of the object class 508, the distance 510 between vehicles 504 and 506, and and/or the occluded percentage of the moving vehicle 506 based on the static occluded region 514 and the non-occluded visible region 516. Additional input features for the trained model which may be captured by the perception system of the vehicle 504, may include the velocity (e.g., X and Y directions) of the vehicle 504, the angle of movement between the vehicles 504 and 506, and various driving/environmental conditions such as the current weather, road conditions, time of day, level of ambient light, etc.

Figure 6:
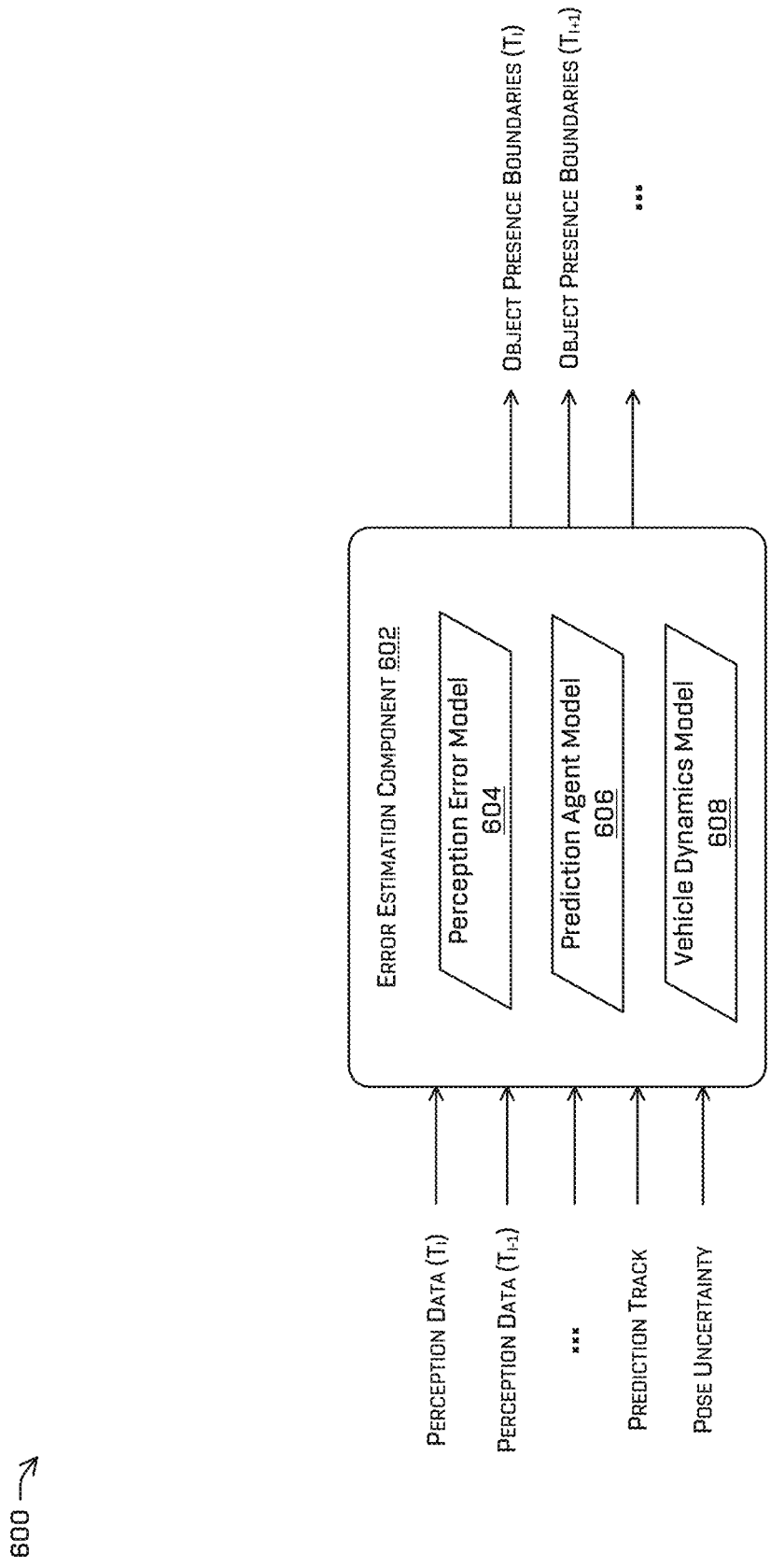
FIG. 6 is a diagram illustrating an example architecture of an error estimation component configured to output estimated perception errors and/or prediction errors based on one or more trained models, in accordance with implementations of the disclosure.

FIG. 6 illustrates an example architecture 600 including an error estimation component 602 configured to execute trained models 604, 606, and 608, and to output estimated perception and/or prediction errors based on the trained models. As discussed above, the error estimation component 602 may operate within a vehicle, simulation system, or other computing environment. In this example, the error estimation component 602 may be similar or identical to the error estimation components 220 or 226 described above. For instance, the error estimation component 602 may receive perception data from a perception system 210 associated with a real or simulated autonomous vehicle, execute models 604-608 configured to output error probability distributions for the perception data, and output error estimations based on the probability distributions.

In this example, the error estimation component 602 may receive as input perception data for multiple different points in time (e.g., $T_i$ and $T_{i-1}$), along with prediction track data and pose regression uncertainty data. As discussed above, the perception data received for $T_i$ and $T_{i-1}$ may include the objects detected by the perception system, the object classifications, object attributes (e.g., sizes, positions, poses, velocities, etc.), and/or other model input features, corresponding to the different points in time. In some examples, the error models 604-608 may require both current and previous perception data in order to capture the Markovian walk in perception error. In some cases, the prediction error models 604-608 may depend most heavily on the pose regression uncertainty signals.

The error estimation component 602 may output error estimations for each time t on the predicted trajectory of the detected object. As shown in this example, the error estimations may include object presence boundaries, described above, which may be rendered as contour lines surrounding the object associated with different levels of object presence probability. In some instances, the error estimation component 602 may output different object presence boundaries (or contour lines) for each time t on the agent's predicted trajectory, and for each standard deviation (e.g., up to six standard deviations). By outputting multiple contours, including one for each standard deviation, simulations and experiments may be executed on the planning system associated with the vehicle which leverage different contours.

Figure 7:
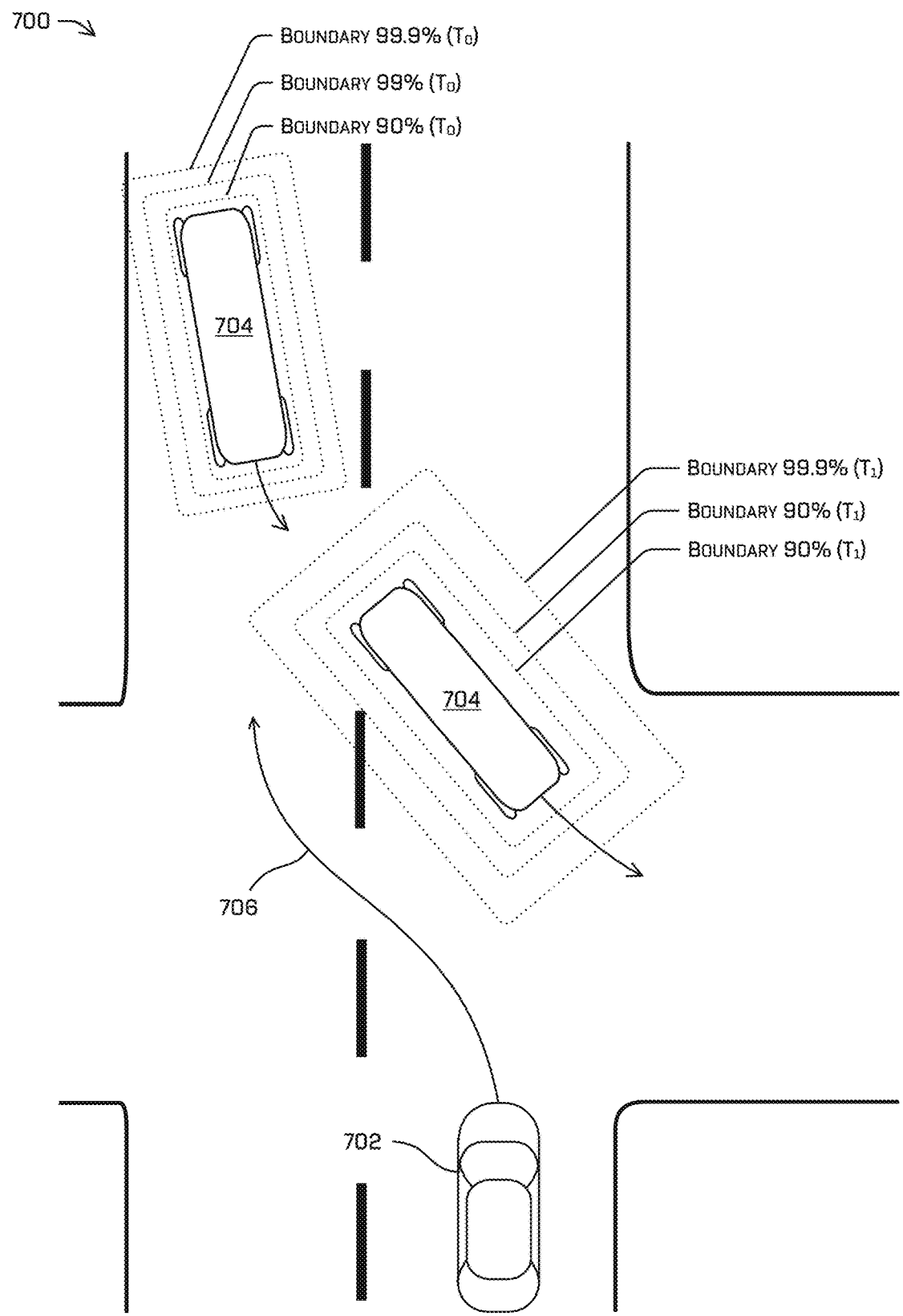
FIG. 7 depicts an example environment in which an autonomous vehicle determines a navigation route based on estimated perception errors and/or prediction errors associated with an object in the environment, in accordance with examples of the disclosure.

FIG. 7 depicts an example environment 700 in which an autonomous vehicle 702 determines a route to navigate around another vehicle 704, based on estimated perception and/or prediction errors determined for the vehicle 704. In this example, the autonomous vehicle 702 may include an error estimation component (e.g., an error estimation component 602) configured to execute one or more trained models (e.g., models 604 and 606) based on perception data from a perception system of the autonomous vehicle 702. In particular, the perception system and prediction system of the autonomous vehicle 702 may determine the object classification, various attributes, and a predicted track for vehicle 704. The object attributes for vehicle 704, and other model input features (e.g., distance between vehicles 702 and 704, velocities of the autonomous vehicle 702, occluded percentage of sensor data for vehicle 704, etc.) may be provided to the trained models to determine perception error probability distributions associated with the vehicle 704. Based on the perception error probability distributions output by the trained model(s), the error estimation component of the autonomous vehicle 702 may determine the object presence boundary lines (or contour lines) shown for the vehicle 704 at times $T_0$ and $T_1$. In this example, the error estimation component of the autonomous vehicle 702 has determined three contour lines for times $T_0$ and $T_1$, corresponding to a 90% probability, 99% probability, and 99.9% probability of avoiding a potential collision. Using the contour lines and the corresponding contour lines, and using a predetermined collision risk tolerance for the autonomous vehicle 702, the planning system of the autonomous vehicle 702 my select the set of contour lines (e.g., the 99.9% contour lines), and determine a navigation route 706 for the autonomous vehicle 702 will not intersect with the selected contour lines at the times corresponding to the contour lines.

As illustrated in this example, the autonomous vehicle 702 may determine various vehicle control actions and/or may select routes and trajectories based on the perception error probability distributions calculated for the other objects in the environment. As another example, if a pedestrian is walking and is perceived or predicted to have a highly uncertain trajectory in the current lane of the autonomous vehicle 702, an action selector component in the planning system may converge on a change lanes action to provide sufficient space to the pedestrian. In contrast, if the trajectory of the pedestrian was calculated to be more certain based on the perception and/or prediction error probability distributions, then the resulting contour lines may be tighter and the planning system may select an in-lane action and the trajectory generator of the planning system may provide a sufficient gap to the pedestrian while passing in accordance with the contour lines. Over time within an autonomous vehicle 702, the error models, perception system and/or prediction may improve. As such, it may be expected that the resulting contour lines generated by the error estimation component may become tighter with the improvements, and as a result the planning system may adjust driving behavior to drive in accordance with a set of higher standard deviation contour lines.

Figure 8:
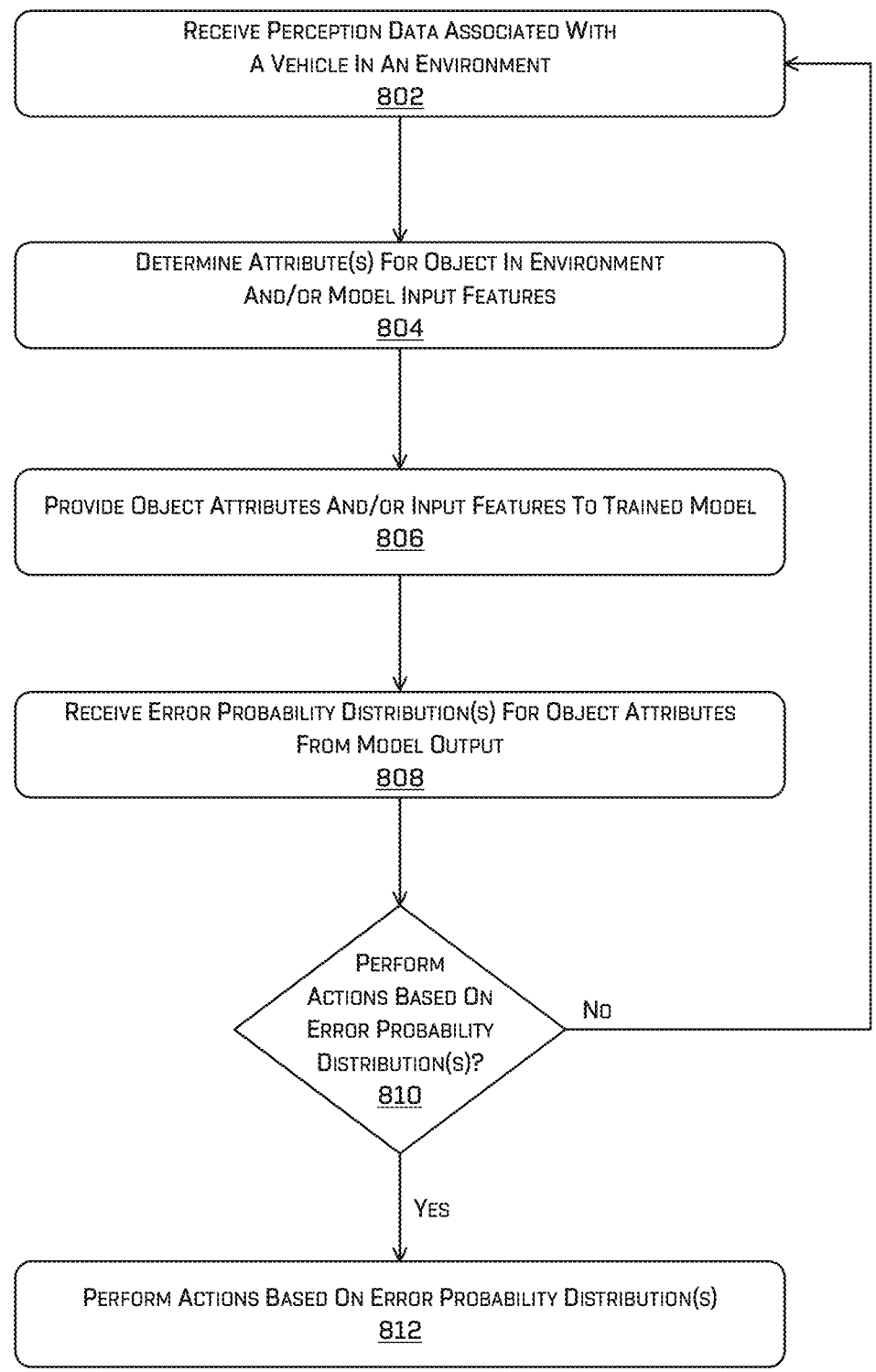
FIG. 8 is a flow diagram illustrating an example process of determining and using perception error probability distributions, in accordance with implementations of the disclosure.

FIG. 8 is a flow diagram illustrating an example process 800 of determining and using perception error probability distributions in accordance with the various systems and techniques discussed above. The operations of process 800 may be performed by one or more computing systems configured to receive and execute trained models based on perception data to determine error probability distributions associated with the perception data. As described above, the such systems may include but are not limited to autonomous vehicles, simulation systems, and additional computing systems configured to perform collision analyses, and determine safety and performance metrics based on log data.

Process 800 is illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types. The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

At operation 802, a computing system may receive perception data associated with a vehicle operating in an environment. As noted above, in various examples the computing system may include a computing system within an autonomous vehicle, or a simulation system for generating, executing, or evaluation driving simulations. In other examples, the computing system may include an analytics server configured to analyze previously stored log data. The perception data may include sensor data captured by sensors of an autonomous vehicle operating in an environment, and/or previously stored log data.

At operation 804, the computing system may analyze the perception data to extract and/or determine object attributes and/or model input features associated with a detected object in the environment. For instance, the perception data received in operation 802 may include a number of attribute values associated with various objects detected by the vehicle sensors. The detected objects may include various types of static or dynamic objects, such as vehicles, pedestrians, bicycles, animals, buildings, street signs, parked vehicles, etc., and the object attributes may include object positions, object sizes, object poses, object poses, object velocities, etc. In addition to determining object attributes from the perception data, the computing system may determine one or more additional model input features such as the object class, the distance from the vehicle to the object, and the occluded percentage of the sensor data or perception data captured for the object, and various other potential model input features described herein. As discussed above, in some cases the perception error probability distributions may be a function of one or more of the model input features, and thus the model input features may be provided to the trained model along with the object attributes.

At operation 806, the computing system may provide the object attributes and/or model input features determine in operation 804, to one or more trained error models. The trained error models may include any of the models described herein, include perception error models, prediction error models, and/or combined perception and prediction error models. As described above in detail, the trained error models may use a mixture density network architecture, or various other mixture model techniques to more accurately model non-normal distributions in perception and/or prediction errors.

At operation 808, the computing system may receive one or more error probability distributions as output from the trained model(s). The error probability distributions may include distributions for individual object attributes (e.g., an object size error distribution, an object position error distribution, etc.), or may include joint distributions of multiple associated object attributes (e.g., object position and velocity error distribution, etc.). As noted above, the distributions may be non-normal and/or multi-modal distributions of the errors and inaccuracy output by the perception system.

At operation 810, the computing system determine whether or not to perform actions based on the perception error probability distributions received in operation 808. In some examples, the perception error probability distribution(s) may be compared to one or more thresholds corresponding to confidence or likelihood of specific types of errors, ranges, of errors, and to the like. In certain cases, based on the comparison of the error probability distribution(s) to the thresholds, the computer system may determine that no additional action is to be performed (810:No), in which case process 800 returns to operation 802. In other cases, the computer system may determine that one or more actions are to be performed based on the perception error probability distributions (810:Yes), in which case process 800 proceeds to operation 812. In some examples, the possible actions performed at operation 812 may be based on the type computing system executing the trained models. For example, the perception error probability distributions may be used by the prediction and/or planning systems of an autonomous vehicle to select a vehicle control action (e.g., lane changes, turning or braking actions, collision avoidance system activation, teleoperations system activation, etc.) for the autonomous vehicle, or to determine a particular route or trajectory for the vehicle based on the perception error probability distributions. As noted above, in some cases vehicle control actions and/or route or trajectory determines may include generating contour lines associated with object presence probabilities, and navigating the vehicle based on the contour lines. In other examples, performing the action(s) may include a simulation system modifying and executing simulations and/or generating new synthetic scenarios for simulations, based on the perception error probability distributions. In still other examples, performing the action(s) in operation 812 may include a data analytics system evaluating repositories of log data to perform collision analyses, calculate safety metrics, etc., based on the perception error probability distributions.

Figure 9:
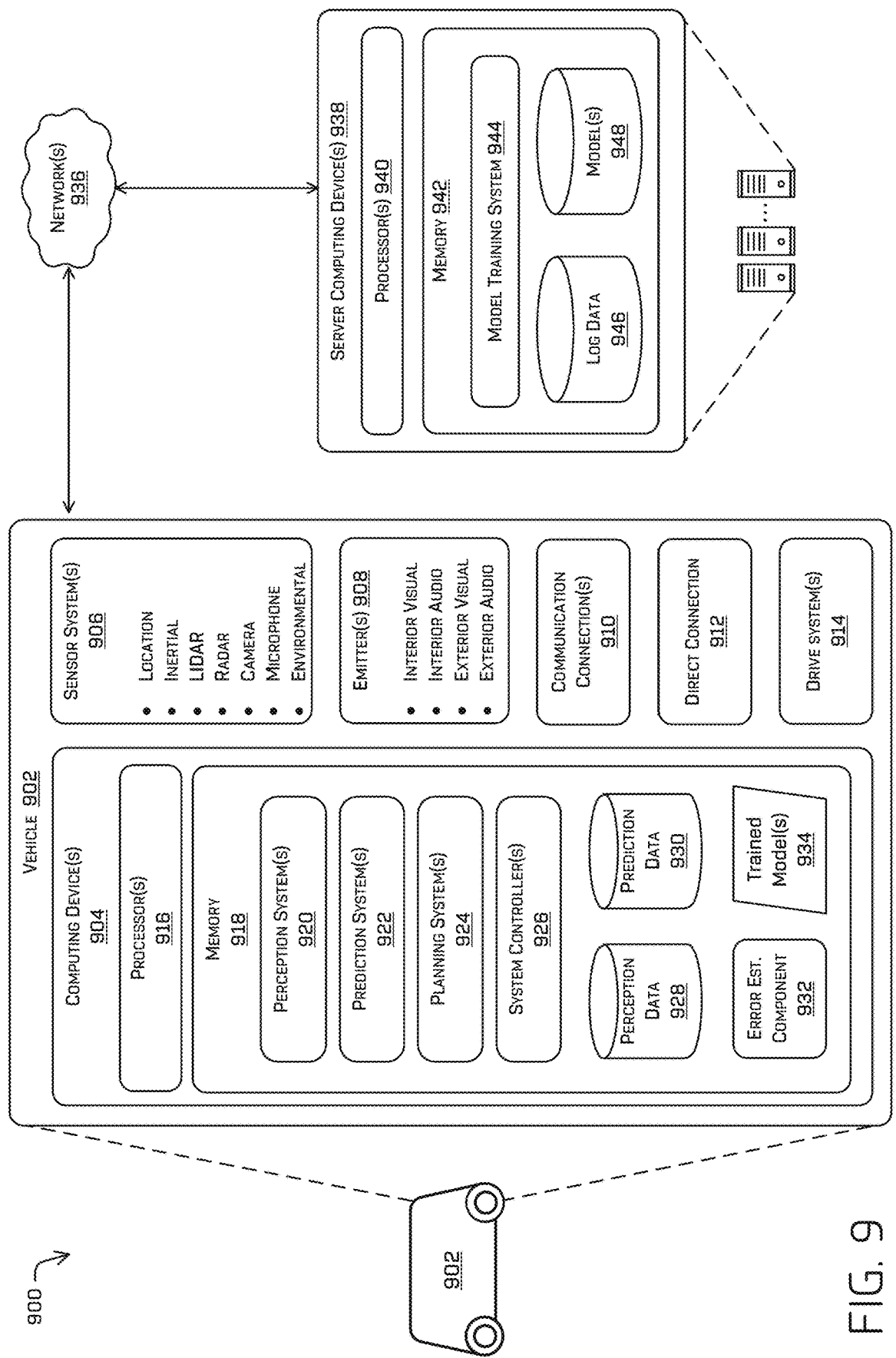
FIG. 9 depicts a block diagram of an example system for implementing the techniques discussed herein.

FIG. 9 depicts a block diagram of an example system 900 for implementing the techniques discussed herein. In at least one example, the system 900 may include one or more vehicles 902, such as any autonomous vehicle (e.g., fully or semi-autonomous vehicle) discussed above. The vehicle 902 may include computing device(s) 904, one or more sensor system(s) 906, one or more emitter(s) 908, one or more communication connection(s) 910 (also referred to as communication devices and/or modems), at least one direct connection 912 (e.g., for physically coupling with the vehicle 902 to exchange data and/or to provide power), and one or more drive system(s) 914. The one or more sensor system(s) 906 may be configured to capture various sensor data associated with a surrounding physical environment.

In at least some examples, the sensor system(s) 906 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 906 may include multiple instances of each type of sensors. For instance, time-of-flight sensors may include individual time-of-flight sensors located at the corners, front, back, sides, and/or top of the vehicle 902. As another example, camera sensors may include multiple cameras disposed at various locations about the exterior and/or interior of the vehicle 902. In some cases, the sensor system(s) 906 may provide input to the computing device(s) 904.

The vehicle 902 may also include one or more emitter(s) 908 for emitting light and/or sound. The one or more emitter(s) 908 in this example include interior audio and visual emitters to communicate with passengers of the vehicle 902. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 908 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 902 can also include one or more communication connection(s) 910 that enable communication between the vehicle 902 and one or more other local or remote computing device(s) (e.g., a remote teleoperations computing device) or remote services. For instance, the communication connection(s) 910 can facilitate communication with other local computing device(s) on the vehicle 902 and/or the drive system(s) 914. Also, the communication connection(s) 910 may allow the vehicle 902 to communicate with other nearby computing device(s) (e.g., other nearby vehicles, traffic signals, etc.).

The communications connection(s) 910 may include physical and/or logical interfaces for connecting the computing device(s) 904 to another computing device or one or more external network(s) 936 (e.g., the Internet). For example, the communications connection(s) 910 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 910 may comprise the one or more modems as described above.

In at least one example, the vehicle 902 may include one or more drive system(s) 914. In some examples, the vehicle 902 may have a single drive system 914. In at least one example, if the vehicle 902 has multiple drive systems 914, individual drive systems 914 may be positioned on opposite ends of the vehicle 902 (e.g., the front and the rear, etc.). In at least one example, the drive system(s) 914 can include one or more sensor system(s) 906 to detect conditions of the drive system(s) 914 and/or the surroundings of the vehicle 902. By way of example and not limitation, the sensor system(s) 906 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 914. In some cases, the sensor system(s) 906 on the drive system(s) 914 can overlap or supplement corresponding systems of the vehicle 902 (e.g., sensor system(s) 906).

The drive system(s) 914 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 914 can include a drive system controller which may receive and preprocess data from the sensor system(s) 906 and to control operation of the various vehicle systems. In some examples, the drive system controller can include one or more processor(s) and memory communicatively coupled with the one or more processor(s). The memory can store one or more modules to perform various functionalities of the drive system(s) 914. Furthermore, the drive system(s) 914 also include one or more communication connection(s) that enable communication by the respective drive system with one or more other local or remote computing device(s).

The computing device(s) 904 may include one or more processors 916 and one or more memories 918 communicatively coupled with the processor(s) 916. In the illustrated example, the memory 918 of the computing device(s) 904 stores perception systems(s) 920, prediction systems(s) 922, planning systems(s) 924, as well as one or more system controller(s) 926. The memory 918 may also store additional data such as perception data 928 and prediction data 930. The perception data may include, or may be based on any of the sensor data captured or collected by the one or more sensors systems 906. For instance, the perception data 928 may be associated with the processed (e.g., classified and segmented) sensor data. The prediction data 930 may be associated with one or more predicted states of the environment and/or any objects detected within the environment. Though depicted as residing in the memory 918 for illustrative purposes, it is contemplated that the perception systems(s) 920, prediction systems(s) 922, planning systems(s) 924, as well as one or more system controller(s) 926 may additionally, or alternatively, be accessible to the computing device(s) 904 (e.g., stored in a different component of vehicle 902 and/or be accessible to the vehicle 902 (e.g., stored remotely).

As discussed above, the perception system 920 may be configured to perform object detection, segmentation, and/or classification on the sensor data captured by sensors 906. In some examples, the perception system 920 may generate processed perception data 928 based on the sensor data. The perception data 928 may indicate a presence of objects that are in physical proximity to the vehicle 902 and/or a classification or type of the objects (e.g., car, pedestrian, cyclist, building, tree, road surface, curb, sidewalk, unknown, etc.). In additional and/or alternative examples, the perception system 920 may generate or identify one or more attributes (or characteristics) associated with the objects and/or the physical environment. In various examples, the attributes associated with the detected objects may include, but are not limited to, an x-position, a y-position, a z-position, an orientation, a type (e.g., a classification), an x-velocity, a y-velocity, an x-size, a y-size, a z-size, a pose, a direction of travel, etc. Characteristics associated with the environment may include, but are not limited to, a presence of another object, a time of day, a weather condition, a geographic position, an indication of darkness/light, etc. For example, details of classification and/or segmentation associated with a perception system are discussed in U.S. application Ser. No. 15/820,245, which are herein incorporated by reference in their entirety.

The prediction system 922 may be configured to determine a track corresponding to an object identified by the perception system 920. For example, the prediction system 922 may be configured to predict a velocity, position, change in trajectory, or otherwise predict the decisions and movement of the identified objects. For example, the prediction system 922 may include one or more machine learned models that may, based on inputs such as object type or classification and object characteristics, output predicted characteristics of the object at one or more future points in time. For example, details of predictions systems are discussed in U.S. application Ser. Nos. 16/246,208 and 16/420, 050, which are herein incorporated by reference in their entirety.

The planning system 924 may be configured to determine a route for the vehicle 902 to follow to traverse through an environment. For example, the planning system 924 may determine various routes and paths and various levels of detail based at least in part on the objects detected, the predicted characteristics of the object at future times, and a set of safety requirements corresponding to the current scenario (e.g., combination of objects detected and/or environmental conditions). In some instances, the planning system 924 may determine a route to travel from a first location (e.g., a current location) to a second location (e.g., a target location) in order to avoid an object obstructing or blocking a planned path of the vehicle 902. In some case, a route can be a sequence of waypoints for traveling between the two locations (e.g., the first location and the second location). In some cases, waypoints include streets, intersections, global positioning system (GPS) coordinates, etc. For example, details of path and route planning by the planning system are discussed in U.S. application Ser. Nos. 16/805,118 and 15/632,208, which are herein incorporated by reference, in its entirety.

In at least one example, the computing device(s) 904 may store one or more system controllers 926, which may be configured to control steering, propulsion, braking, safety, emitters, communication, and other systems of the vehicle 902. The system controllers 926 may communicate with and/or control corresponding systems of the drive system(s) 914 and/or other components of the vehicle 902, which may be configured to operate in accordance with a route provided from the planning system 924.

In some examples, the computing device(s) 904 of the vehicle 902 may store one or more error estimation component 932 and/or one or more trained model 934. For instance, the error estimation component 932 may be similar or identical to the error estimation component 220 or 226, and the trained model 934 may be similar or identical to any combination of models 222, 228, or 230, described above. As discussed in detail above, the error estimation component 932 may execute the trained model 934 based on various perception data 928 (e.g., object attributes, model input features, etc.) and/or prediction data 930, to determine error probability distributions associated with the perception data 928 and/or prediction data 930 associated with the objects detected in the environment.

In some implementations, the vehicle 902 may connect to server computing device(s) 938 via the network(s) 936. For example, the server computing device(s) 938 may receive log data from one or more vehicles 902. The log data may include the sensor data, perception data 928, prediction data 930 and/or a combination thereof. In some cases, the log data may include portion of one or more of the sensor data, perception data 928, and prediction data 930.

One or more server computing device(s) 938 may include one or more processors 940 and memory 942 communicatively coupled with the one or more processors 940. In at least one instance, the processor(s) 940 may be similar to the processor(s) 916 and the memory 942 may be similar to the memory 918. In the illustrated example, the memory 942 of the server computing device(s) 938 stores a model training system 944, which may be similar or identical to the model training system 202 described above. The memory 942 of the server computing device(s) 938 also may store log data 946 received from one or more vehicles 902 and/or simulation systems, which may be used by the model training system 944 to generate and train models 948 configured to output perception error probability distributions. In certain implementations, the server computing device(s) 938 may include a simulation system. In such implementations, the memory 942 also store additional components configured to generate, execute, and evaluate driving simulations based on the log data 946 and/or models 948, including a scenario representation component, simulation execution component, and a simulation output component, configured to select simulation scenarios, apply log data 946 to scenarios during simulations, and output the results of the simulation, etc.

The processor(s) 916 of the computing device(s) 904 and the processor(s) 940 of the server computing device(s) 938 may be any suitable processor capable of executing instructions to process data and perform operations as described herein. By way of example and not limitation, the processor(s) 916 and 940 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 918 of the computing device(s) 904 and the memory 942 of the server computing device(s) 938 are examples of non-transitory computer-readable media. The memory 918 and 942 can store an operating system and one or more software applications, instructions, programs, and/or data to implement the methods described herein and the functions attributed to the various systems. In various implementations, the memory 918 and 942 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 918 and 942 can be implemented as a neural network.

EXAMPLE CLAUSES

A. A system comprising: one or more processors; and one or more non-transitory computer-readable media storing instructions that, when executed by the one or more processors, cause the one or more processors to perform operations comprising: receiving log data associated with a vehicle operating in an environment, the log data including a first attribute of an object in the environment; determining an input feature associated with the object, based at least in part on the log data; providing the first attribute of the object, and the input feature, to a trained Gaussian mixture model configured to output an error probability distribution associated with the first attribute; and performing an action based at least in part on the error probability distribution.

B. The system as recited in paragraph A, wherein performing the action comprises at least one of: determining a collision probability for the vehicle, based at least in part on the error probability distribution; determining an action to be performed by the vehicle within the environment; determining a trajectory for the vehicle within the environment; or executing a simulation, based at least in part on the error probability distribution, to determine a response of an autonomous vehicle controller to the simulation.

C. The system as recited in paragraph A, wherein: the log data includes a second attribute of the object, the trained Gaussian mixture model is configured to output a joint error probability distribution, the joint error probability distribution having an intersection associated with a first error of the first attribute and a second error of the second attribute, and the action is performed based at least in part on the joint error probability distribution.

D. The system as recited in paragraph A, wherein input feature provided to the trained Gaussian mixture model comprises at least one of: an object classification associated with the object; a distance between the vehicle and the object; or an occlusion percentage associated with sensor data collected by the vehicle of the object.

E. The system as recited in paragraph A, wherein performing the action comprises: determining, based at least in part on the error probability distribution, an object presence boundary associated with the object; and determining a trajectory for the vehicle based on the object presence boundary.

F. A method comprising: receiving log data associated with a vehicle operating in an environment, the log data including a first attribute of an object in the environment; providing the first attribute of the object to a trained model configured to output an error probability distribution associated with the first attribute; and performing an action based at least in part on the error probability distribution.

G. The method of paragraph F, wherein performing the action comprises at least one of: determining a collision probability for the vehicle, based at least in part on the error probability distribution; determining an action to be performed by the vehicle within the environment; determining a trajectory for the vehicle within the environment; or executing a simulation, based at least in part on the error probability distribution, to determine a response of an autonomous vehicle controller to the simulation.

H. The method of paragraph F, wherein: the log data includes a second attribute of the object, the trained model is configured to output a joint error probability distribution, the joint error probability distribution having an intersection associated with a first error of the first attribute and a second error of the second attribute, and the action is performed based at least in part on the joint error probability distribution.

I. The method of paragraph H, wherein the first attribute is different from the second attribute, and wherein the first attribute and the second attribute represent at least one of a position of the object, a pose of the object, a size of the object, or a velocity of the object, and wherein the first attribute is different from the second attribute.

J. The method of paragraph F, further comprising: determining an input feature associated with the object, based at least in part on the log data, wherein the input feature includes at least one of an object classification associated with the object, a distance between the vehicle and the object, or an occlusion percentage associated with sensor data collected by the vehicle of the object; and providing the input feature to the trained model, wherein the trained model is configured to output the error probability distribution based at least in part on the input feature.

K. The method of paragraph F, wherein performing the action comprises: determining an object presence probability; determining a first object presence boundary associated with a first time, based at least in part on the error probability distribution and the object presence probability; and navigating the vehicle based on the first object presence boundary.

L. The method of paragraph K, further comprising: determining a predicted track associated with the object; determining a prediction error value associated with the predicted track; determining a second object presence boundary associated with a second time, based at least in part on the error probability distribution and the prediction error value; and navigating the vehicle based on the second object presence boundary.

M. The method of paragraph F, performing the action comprises: sampling from the error probability distribution to determine an updated first attribute; and executing a simulation to determine a response of an autonomous vehicle controller to the simulation, the simulation including a representation of the object having the updated first attribute.

N. One or more non-transitory computer-readable media storing processor- executable instructions that, when executed by one or more processors, cause the one or more processors to perform operations comprising: receiving log data associated with a vehicle operating in an environment, the log data including a first attribute of an object in the environment; providing the first attribute of the object to a trained model configured to output an error probability distribution associated with the first attribute; and performing an action based at least in part on the error probability distribution.

O. The non-transitory computer-readable medium of paragraph N, wherein performing the action comprises at least one of: determining a collision probability for the vehicle, based at least in part on the error probability distribution; determining an action to be performed by the vehicle within the environment; determining a trajectory for the vehicle within the environment; or executing a simulation, based at least in part on the error probability distribution, to determine a response of an autonomous vehicle controller to the simulation.

P. The non-transitory computer-readable medium of paragraph N, wherein: the log data includes a second attribute of the object, the trained model is configured to output a joint error probability distribution, the joint error probability distribution having an intersection associated with a first error of the first attribute and a second error of the second attribute, and the action is performed based at least in part on the joint error probability distribution.

Q. The non-transitory computer-readable medium of paragraph P, wherein the first attribute is different from the second attribute, and wherein the first attribute and the second attribute represent at least one of a position of the object, a pose of the object, a size of the object, or a velocity of the object, and wherein the first attribute is different from the second attribute.

R. The non-transitory computer-readable medium of paragraph N, the operations further comprising: determining an input feature associated with the object, based at least in part on the log data, wherein the input feature includes at least one of an object classification associated with the object, a distance between the vehicle and the object, or an occlusion percentage associated with sensor data collected by the vehicle of the object; and providing the input feature to the trained model, wherein the trained model is configured to output the error probability distribution based at least in part on the input feature.

S. The non-transitory computer-readable medium of paragraph N, wherein performing the action comprises: determining an object presence probability; determining a first object presence boundary associated with a first time, based at least in part on the error probability distribution and the object presence probability; and navigating the vehicle based on the first object presence boundary.

T. The non-transitory computer-readable medium of paragraph S, the operations further comprising: determining a predicted track associated with the object; determining a prediction error value associated with the predicted track; determining a second object presence boundary associated with a second time, based at least in part on the error probability distribution and the prediction error value; and navigating the vehicle based on the second object presence boundary.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples.

A non-limiting list of agents and other objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing instructions that, when executed by the one or more processors, cause the one or more processors to perform operations comprising:
      receiving log data associated with a vehicle operating in an environment, the log data including a first attribute of an object in the environment;
      determining an input feature associated with the object, based at least in part on the log data;
      providing the first attribute of the object, and the input feature, to a trained Gaussian mixture model configured to output an error probability distribution associated with the first attribute; and
      performing an action based at least in part on the error probability distribution, wherein performing the action comprises,
         determining, based at least in part on the error probability distribution, an object presence boundary associated with the object; and
         determining a trajectory for the vehicle based on the object presence boundary.

2. The system as recited in claim 1, wherein performing the action further comprises at least one of:
   determining a collision probability for the vehicle, based at least in part on the error probability distribution;
   determining an action to be performed by the vehicle within the environment; or
   executing a simulation, based at least in part on the error probability distribution, to determine a response of an autonomous vehicle controller to the simulation.

3. The system as recited in claim 1, wherein:
   the log data includes a second attribute of the object,
   the trained Gaussian mixture model is configured to output a joint error probability distribution, the joint error probability distribution having an intersection associated with a first error of the first attribute and a second error of the second attribute, and
   the action is performed based at least in part on the joint error probability distribution.

4. The system as recited in claim 1, wherein input feature provided to the trained Gaussian mixture model comprises at least one of:
   an object classification associated with the object;
   a distance between the vehicle and the object; or
   an occlusion percentage associated with sensor data collected by the vehicle of the object.

5. A method comprising:
   receiving log data associated with a vehicle operating in an environment, the log data including a first attribute and a second attribute of an object in the environment;
   providing the first attribute of the object to a trained model configured to output a joint error probability distribution having an intersection associated with a first error of the first attribute and a second error of the second attribute; and
   performing an action based at least in part on the joint error probability distribution.

6. The method of claim 5, wherein performing the action comprises at least one of:
   determining a collision probability for the vehicle, based at least in part on the joint error probability distribution;
   determining an action to be performed by the vehicle within the environment;
   determining a trajectory for the vehicle within the environment; or
   executing a simulation, based at least in part on the joint error probability distribution, to determine a response of an autonomous vehicle controller to the simulation.

7. The method of claim 5, wherein the first attribute is different from the second attribute, and wherein the first attribute and the second attribute represent at least one of a position of the object, a pose of the object, a size of the object, or a velocity of the object, and wherein the first attribute is different from the second attribute.

8. The method of claim 5, further comprising:
   determining an input feature associated with the object, based at least in part on the log data, wherein the input feature includes at least one of an object classification associated with the object, a distance between the vehicle and the object, or an occlusion percentage associated with sensor data collected by the vehicle of the object; and
   providing the input feature to the trained model, wherein the trained model is configured to output the joint error probability distribution based at least in part on the input feature.

9. The method of claim 5, wherein performing the action comprises:
   sampling from the joint error probability distribution to determine an updated first attribute; and
   executing a simulation to determine a response of an autonomous vehicle controller to the simulation, the simulation including a representation of the object having the updated first attribute.

10. One or more non-transitory computer-readable media storing processor-executable instructions that, when executed by one or more processors, cause the one or more processors to perform operations comprising:

receiving log data associated with a vehicle operating in an environment, the log data including a first attribute of an object in the environment;

providing the first attribute of the object to a trained model configured to output an error probability distribution associated with the first attribute; and performing an action based at least in part on the error probability distribution, wherein performing the action comprises;

determining an object presence probability;

determining a first object presence boundary associated with a first time, based at least in part on the error probability distribution and the object presence probability, and navigating the vehicle based on the first object presence boundary.

11. The non-transitory computer-readable media of claim 10, wherein performing the action further comprises at least one of:

determining a collision probability for the vehicle, based at least in part on the error probability distribution;

determining an action to be performed by the vehicle within the environment;

determining a trajectory for the vehicle within the environment; or executing a simulation, based at least in part on the error probability distribution, to determine a response of an autonomous vehicle controller to the simulation.

12. The non-transitory computer-readable media of claim 10, wherein:

the log data includes a second attribute of the object, the trained model is configured to output a joint error probability distribution, the joint error probability distribution having an intersection associated with a first error of the first attribute and a second error of the second attribute, and the action is performed based at least in part on the joint error probability distribution.

13. The non-transitory computer-readable media of claim 12, wherein the first attribute is different from the second attribute, and wherein the first attribute and the second attribute represent at least one of a position of the object, a pose of the object, a size of the object, or a velocity of the object, and wherein the first attribute is different from the second attribute.

14. The non-transitory computer-readable media of claim 10, the operations further comprising:

determining an input feature associated with the object, based at least in part on the log data, wherein the input feature includes at least one of an object classification associated with the object, a distance between the vehicle and the object, or an occlusion percentage associated with sensor data collected by the vehicle of the object; and providing the input feature to the trained model, wherein the trained model is configured to output the error probability distribution based at least in part on the input feature.

15. The non-transitory computer-readable media of claim 10, the operations further comprising:

determining a predicted track associated with the object;

determining a prediction error value associated with the predicted track;

determining a second object presence boundary associated with a second time, based at least in part on the error probability distribution and the prediction error value; and navigating the vehicle based on the second object presence boundary.

16. A method comprising:

receiving log data associated with a vehicle operating in an environment, the log data including a first attribute of an object in the environment;

providing the first attribute of the object to a trained model configured to output an error probability distribution associated with the first attribute; and performing an action based at least in part on the error probability distribution, wherein performing the action comprises:

determining an object presence probability;

determining a first object presence boundary associated with a first time, based at least in part on the error probability distribution and the object presence probability; and navigating the vehicle based on the first object presence boundary.

17. The method of claim 16, further comprising:

determining a predicted track associated with the object;

determining a prediction error value associated with the predicted track;

determining a second object presence boundary associated with a second time, based at least in part on the error probability distribution and the prediction error value; and navigating the vehicle based on the second object presence boundary.

18. A method comprising:

receiving log data associated with a vehicle operating in an environment, the log data including a first attribute of an object in the environment;

providing the first attribute of the object to a trained model configured to output an error probability distribution associated with the first attribute; and performing an action based at least in part on the error probability distribution, wherein performing the action comprises:

sampling from the error probability distribution to determine an updated first attribute; and executing a simulation to determine a response of an autonomous vehicle controller to the simulation, the simulation including a representation of the object having the updated first attribute.

19. The method of claim 18, wherein:

the log data includes a second attribute of the object, the trained model is configured to output a joint error probability distribution, the joint error probability distribution having an intersection associated with a first error of the first attribute and a second error of the second attribute, and the action is performed based at least in part on the joint error probability distribution.

20. The method of claim 19, wherein the first attribute is different from the second attribute, and wherein the first attribute and the second attribute represent at least one of a position of the object, a pose of the object, a size of the object, or a velocity of the object, and wherein the first attribute is different from the second attribute.

* * * * *